United States Patent
Kawagoshi

(10) Patent No.: US 8,143,938 B2
(45) Date of Patent: Mar. 27, 2012

(54) BOOST CIRCUIT AND LIQUID CRYSTAL DISPLAY DEVICE USING BOOST CIRCUIT

(75) Inventor: Hirokazu Kawagoshi, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 148 days.

(21) Appl. No.: 12/662,563

(22) Filed: Apr. 22, 2010

(65) Prior Publication Data

US 2010/0277226 A1 Nov. 4, 2010

(30) Foreign Application Priority Data

Apr. 24, 2009 (JP) .................... 2009-106621

(51) Int. Cl.
G05F 1/10 (2006.01)
G05F 3/02 (2006.01)

(52) U.S. Cl. ....................................................... 327/536

(58) Field of Classification Search .................. 327/536; 363/59–60

See application file for complete search history.

(56) References Cited

U.S. PATENT DOCUMENTS

| | | | | |
|---|---|---|---|---|
| 6,055,168 A * | 4/2000 | Kotowski et al. | ............... | 363/60 |
| 7,592,856 B2 * | 9/2009 | Ito et al. | ........................ | 327/536 |
| 2005/0047181 A1 * | 3/2005 | Yamamoto et al. | ............ | 363/60 |
| 2005/0219878 A1 * | 10/2005 | Ito et al. | .......................... | 363/59 |
| 2008/0211979 A1 * | 9/2008 | Tonomura | ....................... | 349/33 |

FOREIGN PATENT DOCUMENTS

JP 2008-245500 10/2008

* cited by examiner

Primary Examiner — Quan Tra
(74) Attorney, Agent, or Firm — McGinn IP Law Group, PLLC

(57) ABSTRACT

A charge pump circuit has boost capacitors and a charge switch supplying supply voltage to the boost capacitors, and a step-up ratio thereof is variable by switching a connection relationship of the boost capacitors. A control circuit unit controls switching of the step-up ratio and selects first operation or second operation depending on a sum-based voltage corresponding to a sum of the supply voltage and a undercharge boost capacitor voltage. The first operation is to turn ON/OFF the charge switch in synchronization with a boost clock signal, while the second operation is to turn OFF it irrespective of the boost clock signal. A value of the sum-based voltage with which the first and second operations are switched is a reference value. When switching the step-up ratio from a first ratio to a second ratio lower than the first ratio, the control circuit unit switches the reference value from a first value corresponding to the first ratio to a second value corresponding to the second ratio, and then switches the connection relationship.

9 Claims, 19 Drawing Sheets

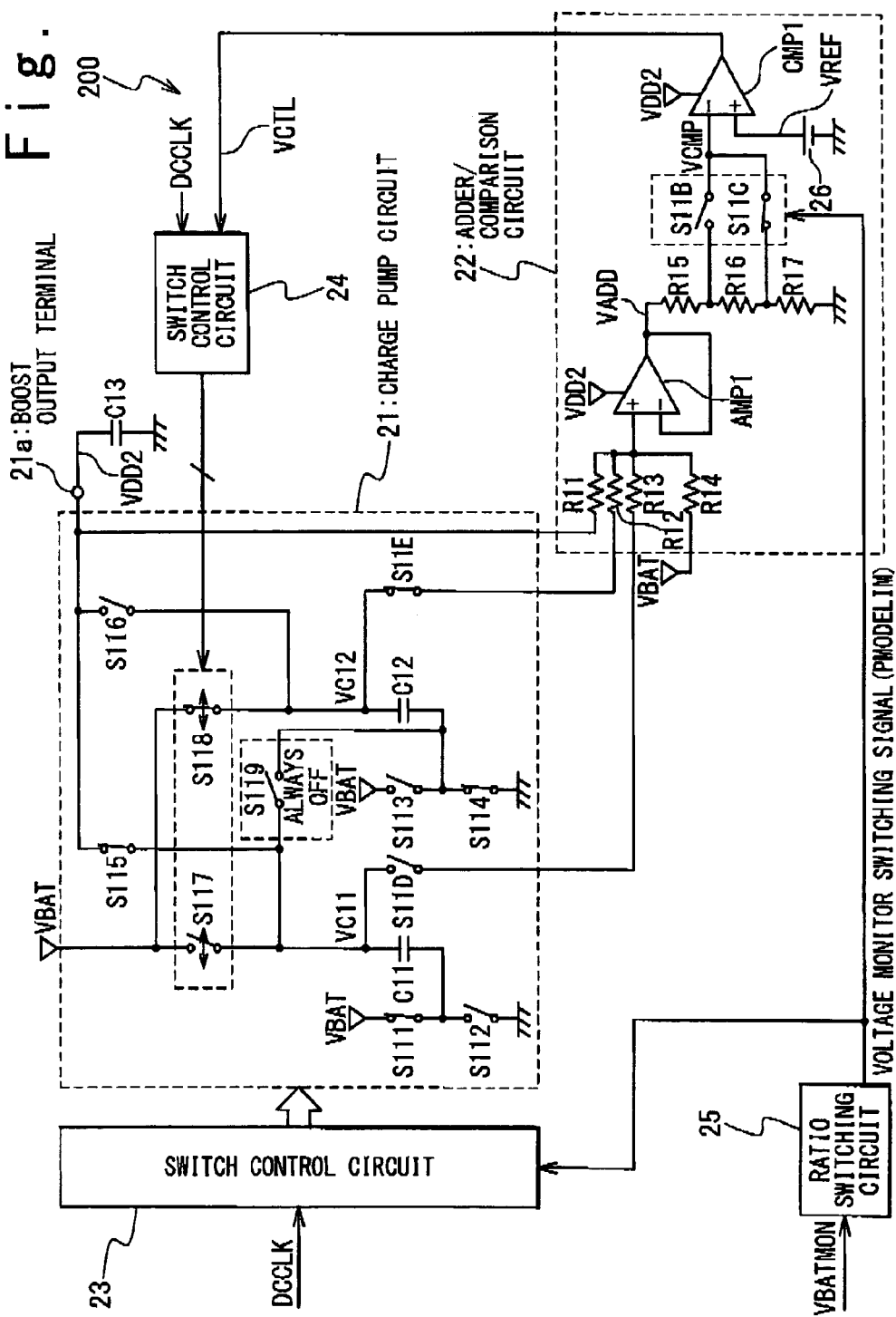

Fig. 3A

DOUBLE-BOOSTING
PMODELIM="Low"

| VCTL | High | | Low | |
|---|---|---|---|---|
| DCCLK | High | Low | High | Low |
| C11 | DISCHARGING | CHARGING | DISCHARGING | STOP CHARGING |
| C12 | CHARGING | DISCHARGING | STOP CHARGING | DISCHARGING |
| S111 | ON | OFF | ON | OFF |
| S112 | OFF | ON | OFF | ON |
| S113 | OFF | ON | OFF | ON |
| S114 | ON | OFF | ON | OFF |
| S115 | ON | OFF | ON | OFF |
| S116 | OFF | ON | OFF | ON |
| S117 | OFF | ON | OFF | OFF |
| S118 | ON | OFF | | |
| S119 | ALWAYS OFF | | | |
| S11B | ALWAYS OFF | | | |
| S11C | ALWAYS ON | | | |
| S11D | OFF | ON | OFF | ON |
| S11E | ON | OFF | ON | OFF |

Fig. 3B

TRIPLE-BOOSTING
PMODELIM="High"

| VCTL | High | | Low | |
|---|---|---|---|---|
| DCCLK | High | Low | High | Low |
| C11 | DISCHARGING | CHARGING | DISCHARGING | STOP CHARGING |
| C12 | DISCHARGING | CHARGING | DISCHARGING | STOP CHARGING |
| S111 | ON | OFF | ON | OFF |
| S112 | OFF | ON | OFF | ON |
| S113 | ALWAYS OFF | | | |
| S114 | OFF | ON | ON | OFF |
| S115 | ALWAYS OFF | | | |
| S116 | ON | OFF | ON | OFF |
| S117 | OFF | ON | OFF | |
| S118 | OFF | ON | OFF | |
| S119 | ON | OFF | ON | OFF |
| S11B | ALWAYS ON | | | |
| S11C | ALWAYS OFF | | | |
| S11D | OFF | ON | OFF | ON |
| S11E | OFF | ON | OFF | ON |

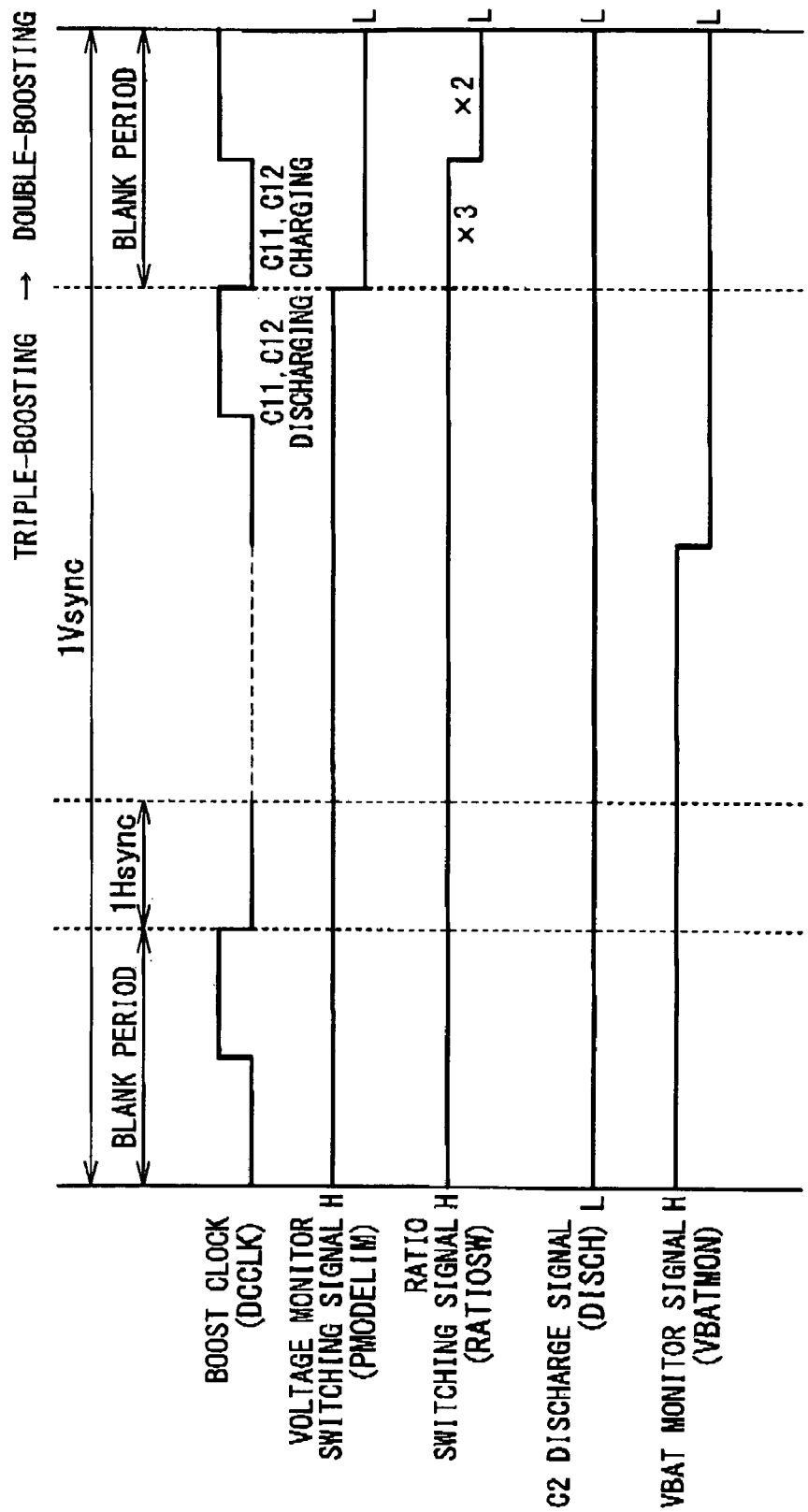

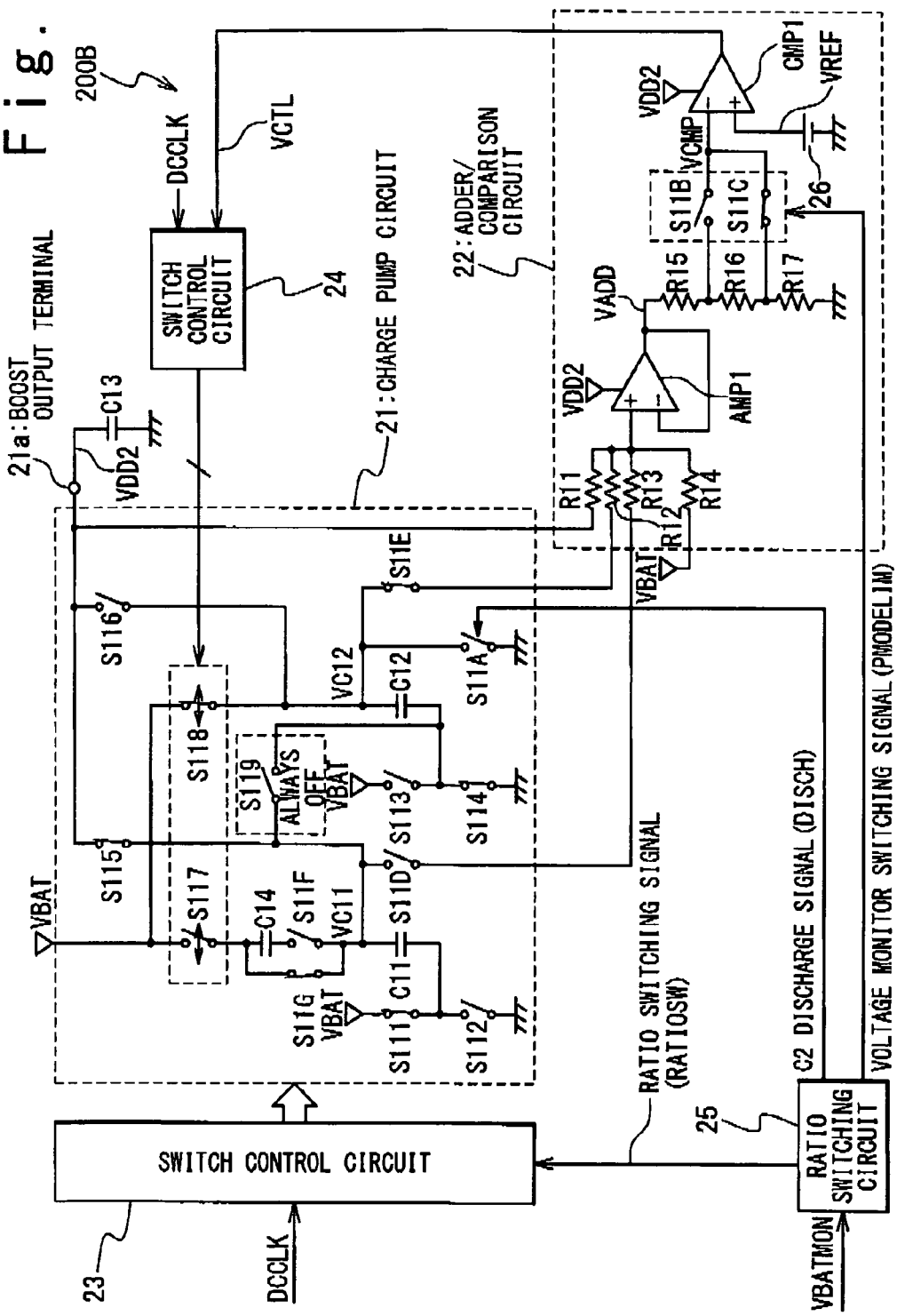

Fig. 9A

DOUBLE-BOOSTING
PMODELIM="Low"

| VCTL | High | | Low | |
|---|---|---|---|---|
| DCCLK | High | Low | High | Low |
| C11 | DISCHARGING | CHARGING | DISCHARGING | STOP CHARGING |
| C12 | CHARGING | DISCHARGING | STOP CHARGING | DISCHARGING |
| S111 | ON | OFF | ON | OFF |
| S112 | OFF | ON | OFF | ON |
| S113 | OFF | ON | OFF | ON |
| S114 | ON | OFF | ON | OFF |
| S115 | ON | OFF | ON | OFF |
| S116 | OFF | ON | OFF | ON |
| S117 | OFF | ON | OFF | |
| S118 | ON | OFF | | |
| S119 | ALWAYS OFF | | | |
| S11B | ALWAYS OFF | | | |
| S11C | ALWAYS ON | | | |
| S11D | OFF | ON | OFF | ON |
| S11E | ON | OFF | ON | OFF |
| C14 | DISCHARGING | CHARGING | DISCHARGING | STOP CHARGING |
| S11F | ALWAYS OFF | | | |
| S11G | ALWAYS ON | | | |

Fig. 9B 2.5-BOOSTING
PMODELIM="High"

| VCTL | High | | Low | |
|---|---|---|---|---|
| DCCLK | High | Low | High | Low |
| C11 | DISCHARGING | CHARGING | DISCHARGING | STOP CHARGING |
| C12 | DISCHARGING | CHARGING | DISCHARGING | STOP CHARGING |
| S111 | ON | OFF | ON | OFF |
| S112 | OFF | ON | OFF | ON |
| S113 | ALWAYS OFF | | | |
| S114 | OFF | ON | ON | OFF |
| S115 | ALWAYS OFF | | | |
| S116 | ON | OFF | ON | OFF |
| S117 | OFF | ON | OFF | |
| S118 | OFF | ON | OFF | |
| S119 | ON | OFF | ON | OFF |
| S11B | ALWAYS ON | | | |
| S11C | ALWAYS OFF | | | |
| S11D | OFF | ON | OFF | ON |
| S11E | OFF | ON | OFF | ON |
| C14 | DISCHARGING | CHARGING | DISCHARGING | STOP CHARGING |
| S11F | OFF | ON | OFF | ON |
| S11G | ALWAYS OFF | | | |

Fig. 10A 2.5-BOOSTING
PMODELIM="Low"

| VCTL | High | | Low | |
|---|---|---|---|---|
| DCCLK | High | Low | High | Low |
| C11 | DISCHARGING | CHARGING | DISCHARGING | STOP CHARGING |
| C12 | DISCHARGING | CHARGING | DISCHARGING | STOP CHARGING |
| S111 | ON | OFF | ON | OFF |
| S112 | OFF | ON | OFF | ON |
| S113 | ALWAYS OFF | | | |
| S114 | OFF | ON | ON | OFF |
| S115 | ALWAYS OFF | | | |
| S116 | ON | OFF | ON | OFF |
| S117 | OFF | ON | OFF | |
| S118 | OFF | ON | OFF | |
| S119 | ON | OFF | ON | OFF |
| S11B | ALWAYS ON | | | |
| S11C | ALWAYS OFF | | | |
| S11D | OFF | ON | OFF | ON |
| S11E | OFF | ON | OFF | ON |
| C14 | DISCHARGING | CHARGING | DISCHARGING | STOP CHARGING |
| S11F | OFF | ON | OFF | ON |
| S11G | ALWAYS OFF | | | |

Fig. 10B

TRIPLE-BOOSTING
PMODELIM="High"

| VCTL | High | | Low | |
|---|---|---|---|---|
| DCCLK | High | Low | High | Low |
| C11 | DISCHARGING | CHARGING | DISCHARGING | STOP CHARGING |
| C12 | DISCHARGING | CHARGING | DISCHARGING | STOP CHARGING |
| S111 | ON | OFF | ON | OFF |
| S112 | OFF | ON | OFF | ON |
| S113 | ALWAYS OFF | | | |
| S114 | OFF | ON | ON | OFF |
| S115 | ALWAYS OFF | | | |
| S116 | ON | OFF | ON | OFF |
| S117 | OFF | ON | OFF | OFF |
| S118 | OFF | ON | OFF | OFF |
| S119 | ON | OFF | ON | OFF |
| S11B | ALWAYS ON | | | |
| S11C | ALWAYS OFF | | | |
| S11D | OFF | ON | OFF | ON |
| S11E | OFF | ON | OFF | ON |
| C14 | STOP CHARGING | STOP CHARGING | STOP CHARGING | STOP CHARGING |
| S11F | ALWAYS OFF | | | |
| S11G | OFF | ON | OFF | ON |

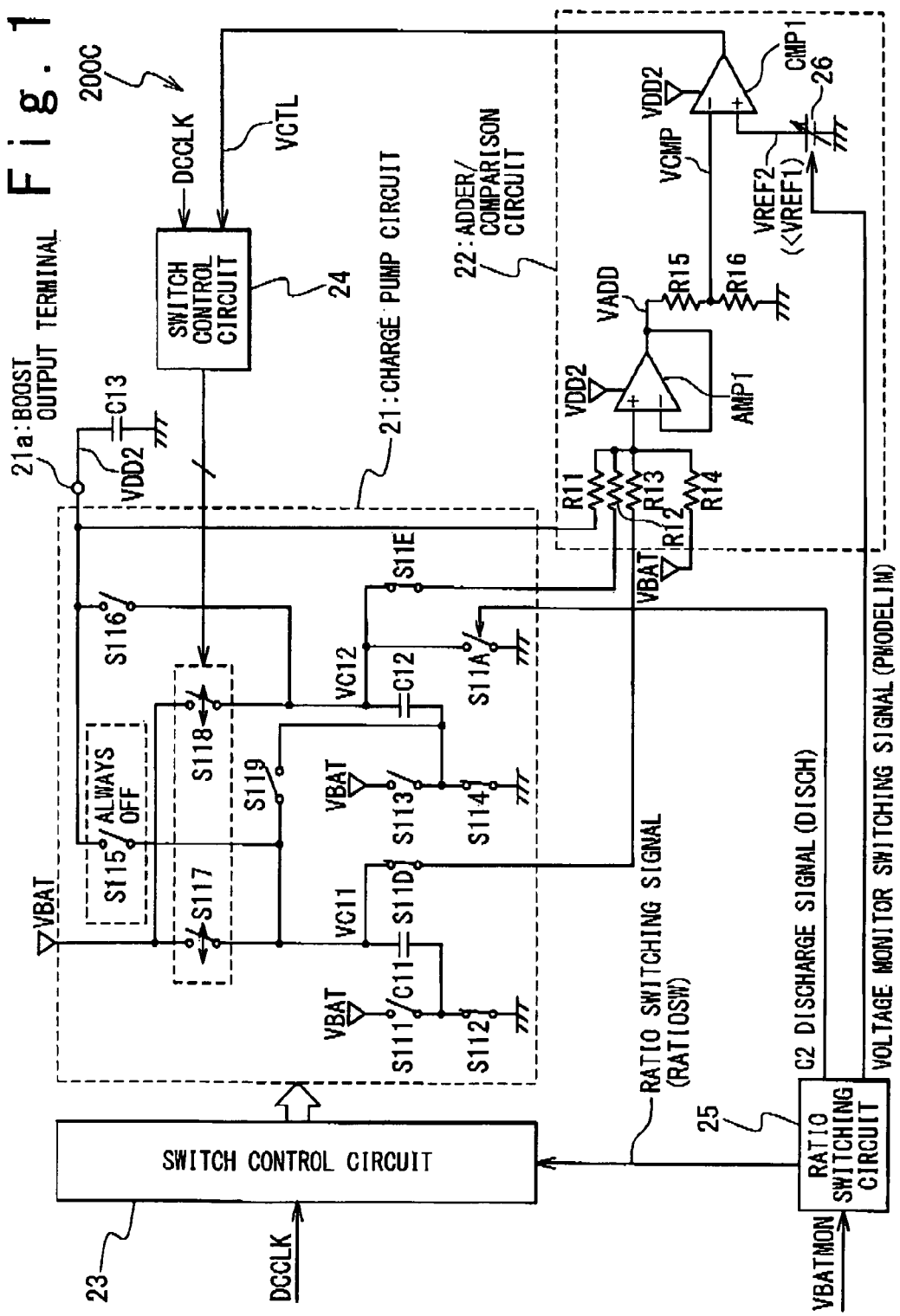

BOOST CIRCUIT AND LIQUID CRYSTAL DISPLAY DEVICE USING BOOST CIRCUIT

INCORPORATION BY REFERENCE

This application is based upon and claims the benefit of priority from Japanese patent application No. 2009-106621, filed on Apr. 24, 2009, the disclosure of which is incorporated herein in its entirety by reference.

BACKGROUND OF THE INVENTION

1. Field of the Invention

The present invention relates to a boost circuit and an operation method for the boost circuit. In particular, the present invention relates to a boost circuit that performs a boost operation by using a charge pump, and an operation method for the boost circuit.

2. Description of Related Art

A charge pump-type boost circuit is one of basic circuits used for various devices. For example, the charge pump-type boost circuit is installed in a liquid crystal display panel drive IC (Integrated Circuit) for a cellular phone. The boost circuit boosts a supply voltage supplied from a power supply such as a battery to generate a panel-driving voltage for driving the liquid crystal display panel.

The boost circuit is required to provide a desired output voltage stably even if the supply voltage is greatly varied. A configuration of the boost circuit that satisfies such a requirement is disclosed in Japanese Patent Publication JP-2008-245500A. According to this related technique, the boost circuit monitors a sum of the supply voltage and a voltage of a boost capacitor during a period when the boost capacitor is charged and controls the charging of the boost capacitor depending on the sum. According to the control, the voltage charged to the boost capacitor is adjusted in response to the supply voltage, and thus a desired output voltage can be stably obtained for a wide range of the supply voltage.

SUMMARY

The inventor of the present application has recognized the following points. According to any of various boost circuits disclosed in the above-mentioned Japanese Patent Publication JP-2008-245500A, a step-up ratio of the boost circuit is fixed. In order to extend an allowable range of the supply voltage, it is desirable that the step-up ratio is switchable. However, if an operation at the time of switching the step-up ratio is inappropriate, the output voltage of the boost circuit greatly varies at the moment when the step-up ratio is switched. This is not preferable in terms of circuit characteristics. For example, in a case of the boost circuit installed in a liquid crystal display panel drive IC, stripe unevenness can be caused in an image if the output voltage of the boost circuit greatly varies at the moment when the step-up ratio is switched.

It is therefore desired to provide a boost circuit by which a desired output voltage can be stably obtained even if the supply voltage varies greatly and in which variation of the output voltage at the time when the step-up ratio is switched is small.

In one exemplary embodiment of the present invention, a boost circuit has: a charge pump circuit configured to boost a supply voltage by using a boost clock signal to generate a boost output voltage; and a control circuit unit configured to control the charge pump circuit. The charge pump circuit has: a plurality of boost capacitors; and a charge switch that supplies the supply voltage to the boost capacitors. The charge pump circuit is configured such that a step-up ratio thereof is variable by switching a connection relationship of the plurality of boost capacitors. The control circuit unit is configured to control switching of the step-up ratio of the charge pump circuit and to select and perform any of a first operation and a second operation depending on a sum-based voltage, the first operation being to turn ON and OFF the charge switch in synchronization with the boost clock signal, the second operation being to turn OFF the charge switch irrespective of the boost clock signal, and the sum-based voltage being generated corresponding to a sum of the supply voltage and a voltage of a under-charge boost capacitor that is being charged among the plurality of boost capacitors. A value of the sum-based voltage with which an operation of the charge switch is switched between the first operation and the second operation is a reference value. When switching the step-up ratio of the charge pump circuit from a first ratio to a second ratio lower than the first ratio, the control circuit unit switches the reference value from a first value that is determined corresponding to the first ratio to a second value that is determined corresponding to the second ratio, and then switches the connection relationship of the plurality of boost capacitors of the charge pump circuit.

In another exemplary embodiment of the present invention, a boost circuit has a charge pump circuit configured to boost a supply voltage by using a boost clock signal to generate a boost output voltage; and a control circuit unit configured to control the charge pump circuit. The charge pump circuit has: a plurality of boost capacitors; a charge switch that supplies the supply voltage to the boost capacitors; and a discharge switch that discharges one boost capacitor of the plurality of boost capacitors to ground. The charge pump circuit is configured such that a step-up ratio thereof is variable by switching a connection relationship of the plurality of boost capacitors. The control circuit unit is configured to control switching of the step-up ratio of the charge pump circuit and to select and perform any of a first operation and a second operation depending on a sum-based voltage, the first operation being to turn ON and OFF the charge switch in synchronization with the boost clock signal, the second operation being to turn OFF the charge switch irrespective of the boost clock signal, and the sum-based voltage being generated corresponding to a sum of the supply voltage and a voltage of a under-charge boost capacitor that is being charged among the plurality of boost capacitors. A value of the sum-based voltage with which an operation of the charge switch is switched between the first operation and the second operation is a reference value. When switching the step-up ratio of the charge pump circuit from a second ratio to a first ratio higher than the second ratio, the control circuit unit switches the reference value of the sum-based voltage from a second value that is determined corresponding to the second ratio to a first value that is determined corresponding to the first ratio as well as discharges the one boost capacitor through the discharge switch, and then switches the connection relationship of the plurality of boost capacitors of the charge pump circuit.

According to the boost circuit of the present invention, a desired output voltage can be stably obtained even if the supply voltage varies greatly, and variation of the output voltage at the time when the step-up ratio is switched is small.

BRIEF DESCRIPTION OF THE DRAWINGS

The above and other objects, advantages and features of the present invention will be more apparent from the following description of certain preferred exemplary embodiments taken in conjunction with the accompanying drawings, in which:

FIGS. 2A and 2B each is a circuit diagram showing a configuration of a boost circuit studied by the inventor;

FIG. 3A is a table showing operations of switches and capacitors when a double boosting operation is carried out in the boost circuit shown in FIGS. 2A and 2B;

FIG. 3B is a table showing operations of switches and capacitor when a triple boosting operation is carried out in the boost circuit shown in FIGS. 2A and 2B;

FIG. 6A is a timing chart showing an operation of the boost circuit shown in FIGS. 5A and 5B when the step-up ratio is switched from triple to double;

FIGS. 8A and 8B each is a circuit diagram showing a configuration of a boost circuit according to another exemplary embodiment of the present invention;

FIG. 9A is a table showing operations of switches and capacitors when a double boosting operation is carried out in the boost circuit shown in FIGS. 8A and 8B;

FIG. 9B is a table showing operations of switches and capacitors when a 2.5-boosting operation is carried out in the boost circuit shown in FIGS. 8A and 88;

FIG. 10A is a table showing operations of switches and capacitors when a 2.5-boosting operation is carried out in the boost circuit shown in FIGS. 8A and 8B;

FIG. 10B is a table showing operations of switches and capacitors when a triple boosting operation is carried out in the boost circuit shown in FIGS. 8A and 8B; and FIGS. 11A and 11B each is a circuit diagram showing a configuration of a boost circuit according to still another exemplary embodiment of the present invention.

DESCRIPTION OF PREFERRED EMBODIMENTS

The invention will be now described herein with reference to illustrative exemplary embodiments. Those skilled in the art will recognize that many alternative exemplary embodiments can be accomplished using the teachings of the present invention and that the invention is not limited to the exemplary embodiments illustrated for explanatory purposed.

Exemplary embodiments of a boost circuit of the present invention will be described below with reference to the attached drawings. In the following exemplary embodiments, the boost circuit of the present invention is applied to a power supply circuit of a liquid crystal display device. It will be obvious for a person skilled in the art that the boost circuit can be used for various devices in addition to the liquid crystal display device.

Figure 1:
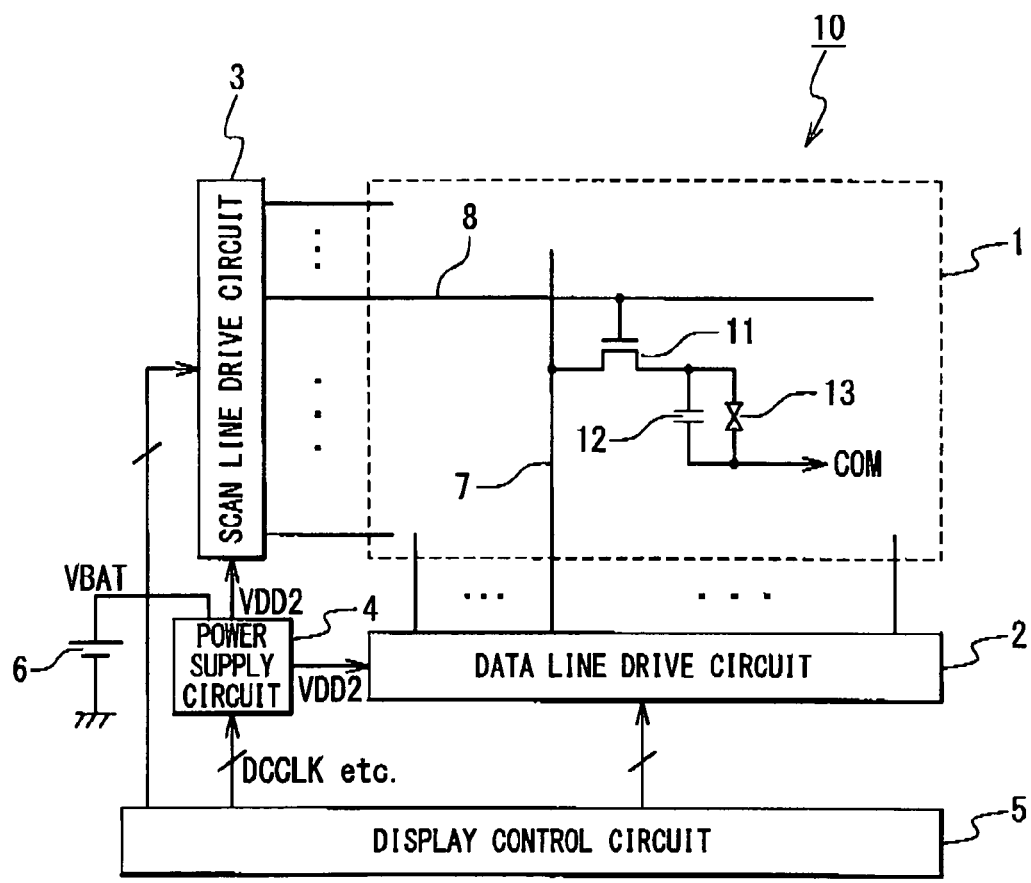
FIG. 1 is a block diagram showing a configuration of a liquid crystal display device according to an exemplary embodiment of the present invention.

FIG. 1 is a block diagram showing a configuration of a liquid crystal display device 10 having a boost circuit according to an exemplary embodiment of the present invention. The liquid crystal display device 10 has a liquid crystal display panel 1, a data line drive circuit 2, a scan line drive circuit 3, a power supply circuit 4, a display control circuit 5 and a battery 6.

The liquid crystal display panel 1 has data lines 7 and scan lines 8. In FIG. 1, the data lines 7 are so provided as to extend in a vertical direction and be arranged in a lateral direction, and the scan lines 8 are so provided as to extend in the lateral direction and be arranged in the vertical direction. Pixels are formed at respective intersections of the data lines 7 and the scan lines 8. Each pixel has a TFT (Thin Film Transistor) 11, a retention capacitor 12 and a liquid crystal capacitor 13. A gate of the TFT 11 is connected to the scan line 8, and a source (drain) of the TFT 11 is connected to the data line 7. A drain (source) of the TFT 11 is connected to the retention capacitor 12 and the liquid crystal capacitor 13, and the other ends of the retention capacitor 12 and the liquid crystal capacitor 13 are connected to a common electrode COM. The liquid crystal capacitor 13 is a capacitive element having a pixel electrode, a common electrode and liquid crystal filled between the pixel electrode and the common electrode.

The data line drive circuit 2 (driver circuit unit) outputs an analog signal voltage (gradation voltage) in response to a digital image signal to drive the data line 7. The scan line drive circuit 3 drives the scan line 8 to select the TFT 11 of each pixel. The power supply circuit 4 boosts, by using the boost circuit, a battery voltage VBAT (supply voltage) supplied from the battery 6 to generate a power supply voltage VDD2 (boost output voltage), and supplies the generated power supply voltage VDD2 to the data line drive circuit 2 and the scan line drive circuit 3. The display control circuit 5 generates control signals for controlling operations of the data line drive circuit 2, the scan line drive circuit 3 and the power supply circuit 4, and controls these circuits. The control signals supplied from the display control circuit 5 to the power supply circuit 4 include a boost clock signal DCCLK. The boost clock signal DCCLK is used as a boost clock for operating a charge pump circuit of the boost circuit provided in the power supply circuit 4, as will be described later.

Figure 2B:
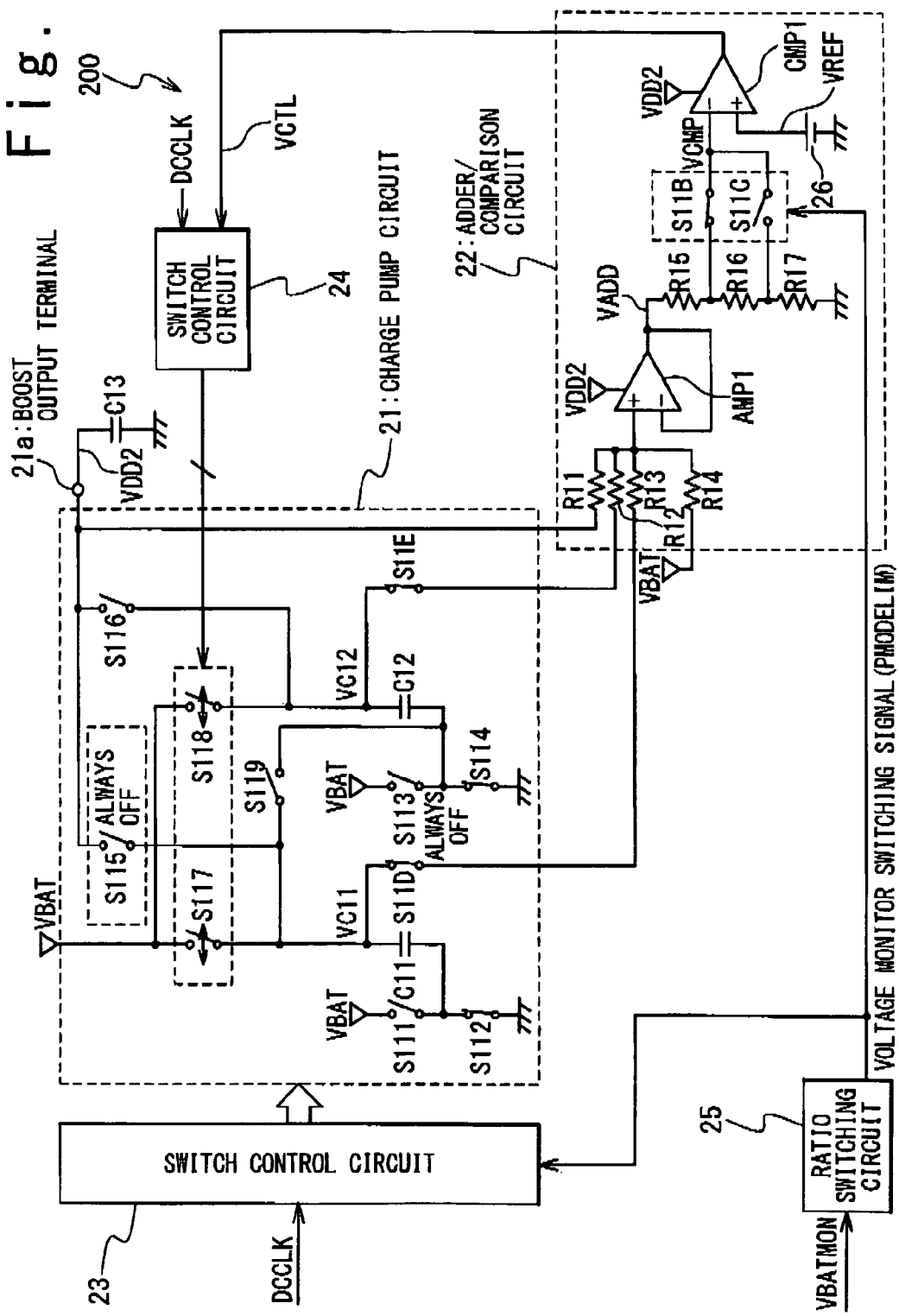

It is preferable that the boost circuit provided in the power supply circuit 4 can supply a constant power supply voltage VDD2 even if a variation width of the battery voltage VBAT (supply voltage) is large. To satisfy such a requirement, it is preferable that the boost circuit is configured such that a step-up ratio thereof is variable. In addition, to monitor a sum of the supply voltage and a voltage of a boost capacitor during a period when the boost capacitor is charged is preferable for stabilizing the power supply voltage VDD2. Therefore, the inventor of the present application has first studied a boost circuit configured to variably set the step-up ratio and to monitor the sum of the battery voltage VBAT and the voltage of the boost capacitor during the period when the boost capacitor is charged. FIGS. 2A and 2B each is a circuit diagram showing a configuration of the boost circuit 200 studied by the inventor. First, the boost capacitor 200 shown in FIGS. 2A and 2B will be described below.

The boost circuit 200 shown in FIGS. 2A and 2B has a charge pump circuit 21, an adder/comparison circuit 22, switch control circuits 23 and 24 and a ratio switching circuit 25.

The charge pump circuit 21 boosts the battery voltage VBAT (supply voltage) to generate an output power supply voltage VDD2 (boost output voltage) and outputs the output power-supply voltage VDD2 from a boost output terminal 21a. A smoothing capacitor C13 is connected to the boost output terminal 21a in order to stabilize the output power supply voltage VDD2. More specifically, the charge pump circuit 21 is provided with switches S111 to S119, S11D and S11E, and boost capacitors C11 and C12. In the exemplary embodiment, PMOS transistors are used as the switches S111, S113, S115, S116, S117 and S119, NMOS transistors are used as the switches S112 and S114, and transfer gates are used as the switches S11D and S11E. The switches S111 to S116, S119, S11D and S11E are controlled by the switch control circuit 23, and the switches S117 and S118 are controlled by the switch control circuit 24. Here, the switches S117 and S118 (charge switches) supply the battery voltage VBAT (supply voltage) to the boost capacitors C11 and C12 to charge these boost capacitors.

The charge pump circuit 21 is configured such that a step-up ratio thereof is variable by switching a connection relationship of the boost capacitors C11 and C12. Specifically, in the case of FIGS. 2A and 2B, the charge pump circuit 21 is configured to perform "double boosting operation" and "triple boosting operation" by switching the connection relationship between the boost capacitors C11 and C12 by ON/OFF controlling the switches S111 to S119, S11D and S11E. In the case where the charge pump circuit 21 performs the double boosting operation, as shown in FIG. 2A, the switch S119 is always turned OFF and the other switches are turned ON/OFF in synchronization with the boost clock signal DCCLK. It should be noted that the boost capacitors C11 and C12 are alternately charged and discharged when the charge pump circuit 21 performs the double boosting operation, namely the step-up ratio is double (second ratio). On the other hand, in the case where the charge pump circuit 21 performs the triple boosting operation, as shown in FIG. 2B, the switches S113 and S115 are always turned OFF and the other switches are turned ON/OFF in synchronization with the boost clock signal DCCLK. It should be noted that the boost capacitors C11 and C12 are concurrently charged and discharged when the charge pump circuit 21 performs the triple boosting operation, namely the step-up ratio is triple (first ratio). The operation of the charge pump circuit 21 will be described later in more detail.

The adder/comparison circuit 22, the switch control circuits 23 and 24 and the ratio switching circuit 25 constitute a "control circuit unit" for controlling the charge pump circuit 21. More specifically, the adder/comparison circuit 22 (adder circuit unit and comparison circuit unit) is provided with an operational amplifier AMP1, a comparator CMP1, resistor elements R11 to R17, switches SUB and S11C, and a constant-voltage source 26 that outputs a predetermined reference voltage VREF. The adder/comparison circuit 22 operates as follows. First, the adder/comparison circuit 22 has a function of generating a voltage VADD (sum-based voltage) that corresponds to a sum of a voltage VC11 of the boost capacitor C11, a voltage VC12 of the boost capacitor C12, the battery voltage VBAT (supply voltage) and the output power supply voltage VDD2 (boost output voltage). This function is achieved by the resistor elements R11 to R14 and the operational amplifier AMP1 whose output is connected to its inverting input. Note that the voltage VC11 of the boost capacitor C11 and the voltage VC12 of the boost capacitor C12 are supplied to the adder/comparison circuit 22 only when the boost capacitors are being charged. Consequently, the adder/comparison circuit 22 operates as follows.

(1) In the case where the charge pump circuit 21 performs the double boosting operation, during a period when the boost capacitor C11 is being charged, the adder/comparison circuit 22 generates the sum-based voltage VADD to be one-third of the sum of the voltage VC11 of the boost capacitor C11 (under-charge boost capacitor), the battery voltage VBAT and the output power supply voltage VDD2. On the other hand, during a period when the boost capacitor C12 is being charged, the adder/comparison circuit 22 generates the sum-based voltage VDD to be one-third of the sum of the voltage VC12 of the boost capacitor C12 (under-charge boost capacitor), the battery voltage VBAT and the output power supply voltage VDD2.

(2) In the case where the charge pump circuit 21 performs the triple boosting operation, during a period when the boost capacitors C11 and C12 are being charged, the adder/comparison circuit 22 generates the sum-based voltage VADD to be one-fourth of the sum of the voltage VC11 of the boost capacitor C11 (under-charge boost capacitor), the voltage VC12 of the boost capacitor C12 (under-charge boost capacitor), the battery voltage VBAT and the output power supply voltage VDD2.

Moreover, the adder/comparison circuit 22 is configured to voltage-divide the voltage VADD to generate a comparison voltage VCMP, to compare the comparison voltage VCMP with the predetermined reference voltage VREF, and to generate an output signal VCTL depending on the comparison result. The resistor elements R15 to R17 and the switches S11B and S11C in the adder/comparison circuit 22 have the function of converting the voltage VADD into the comparison voltage VCMP. In the present exemplary embodiment, a ratio of the comparison voltage VCMP to the voltage VADD is switchable by using the switches S11B and S11C. The switches S11B and S11C are controlled in response to a voltage monitor switching signal PMODELIM. More specifically, when the switch S11B is set to OFF and the switch S11C is set to ON as shown in FIG. 2A, the comparison voltage VCMP is represented by the following equation:

$$VCMP = VADD \times R17/(R15+R16+R17)$$

On the other hand, when the switch S11B is set to ON and the switch S11C is set to OFF as shown in FIG. 2B, the comparison voltage VCMP is represented by the following equation:

$$VCMP = VADD \times (R16+R17)/(R15+R16+R17)$$

In a case where the comparison voltage VCMP is lower than the reference voltage VREF, the output signal VCTL is asserted (set to High level in the present exemplary embodiment). In a case where the comparison voltage VCMP is higher than the reference voltage VREF, the output signal VCTL is negated (set to Low level in the present exemplary embodiment).

A value of the sum-based voltage VADD with which the output signal VCTL is switched from the Low level to the High level or from the High level to the Low level is a "reference value". In other words, the output signal VCTL transits when the sum-based voltage VADD becomes the reference value. The reference value needs to be switched between the cases where the charge pump circuit 21 performs the double boosting operation and the triple boosting operation. Specifically, the reference value of the sum-based voltage VADD in the case where the charge pump circuit 21 performs the double boosting operation is "VADD1" (second value) that is determined corresponding to the above-mentioned second ratio. On the other hand, the reference value of the sum-based voltage VADD in the case where the charge pump circuit 21 performs the triple boosting operation is "VADD2" (first value) that is determined corresponding to the above-mentioned first ratio. The second value VADD1 needs to be higher than the first value VADD2.

The above-mentioned switches S11B and S11C are used for switching the reference value between VADD1 and VADD2. More specifically, in the case of the second boosting operation, the voltage monitor switching signal PMODELIM is set to the Low level, and hence the switch S11B is turned OFF and the switch S11C is turned ON, as shown in FIG. 2A. Therefore, the reference value (second value) VADD1 in the case of the double boosting operation is represented by the following equation:

$$VADD1 = VREF \times (R15+R16+R17)/R17 \qquad (1)$$

On the other hand, in the case of the triple boosting operation, the voltage monitor switching signal PMODELIM is set to the High level, and hence the switch S11B is turned ON and the switch S11C is turned OFF, as shown in FIG. 2B. Therefore, the reference value (first value) VADD2 in the case of the triple boosting operation is represented by the following equation:

$$VADD2 = VREF \times (R15+R16+R17)/(R16+R17) \qquad (2)$$

In this manner, the control circuit unit switches the reference value between the first value VADD2 and the second value VADD1 by switching the ratio of the comparison voltage VCMP to the sum-based voltage VADD. It should be noted here that the reference value (first value) VADD2 in the case of the triple boosting operation is lower than the reference value (second value) VADD1 in the case of the double boosting operation. The output signal VCTL thus generated by the adder/comparison circuit 22 is supplied to the switch control circuit 24.

The switch control circuit 23 has a function of controlling the switches S111 to S116, S119, S11D and SUE of the charge pump circuit 21. More specifically, the switch control circuit 23 ON/OFF controls the switches S111 to S116, S119, S11D and SUE in synchronization with the boost clock signal DCCLK. Here, the switch control circuit 23 switches the method of ON/OFF controlling the switches S111 to S116, S119, S11D and S11E depending upon whether the charge pump circuit 21 carries out the double boosting operation or the triple boosting operation. More specifically, when the charge pump circuit 21 performs the double boosting operation, the voltage monitor switching signal PMODELIM is set to the Low level. In response to the voltage monitor switching signal PMODELIM being set to the Low level, the switch control circuit 23 turns OFF the switch S119 and turns ON/OFF the other switches in synchronization with the boost clock signal DCCLK, as shown in FIG. 2A. On the other hand, when the charge pump circuit 21 performs the triple boosting operation, the voltage monitor, switching signal PMODELIM is set to the High level. In response to the voltage monitor switching signal PMODELIM being set to the High level, the switch control circuit 23 turns OFF the switches S113 and S115 and turns ON/OFF the other switches in synchronization with boost clock signal DCCLK, as shown in FIG. 2B.

The switch control circuit 24 has a function of controlling the switches S117 and S118 (charge switches) of the charge pump circuit 21 in response to the output signal VCTL from the adder/comparison circuit 22. In the case where the comparison voltage VCMP is lower than the reference voltage VREF (i.e., the sum-based voltage VADD is lower than the reference value VADD1 or VADD2) and the output signal VCTL is set to the High level, the switch control circuit 24 turns ON/OFF the switches S117 and S118 (charge switches) in synchronization with the boost clock signal DCCLK, which is a "first operation". On the other hand, in the case where the comparison voltage VCMP is higher than the reference voltage VREF (i.e., the sum-based voltage VADD is higher than the reference value VADD1 or VADD2) and the output signal VCTL is set to the Low level, the switch control circuit 24 keeps the switches S117 and S118 (charge switches) OFF irrespective of the boost clock signal DCCLK, which is a "second operation". In this case, the boost capacitors C11 and C12 are not charged. In this manner, the switch control circuit 24 selects the operation of the switches S117 and S118 (charge switches) from the first operation and the second operation depending on the output signal VCTL of the adder/comparison circuit 22, i.e., depending on the sum-based voltage VADD.

The ratio switching circuit 25 has a function of switching the step-up ratio of the charge pump circuit 21 depending on the voltage of the battery 6 (i.e., the battery voltage VBAT). More specifically, a VBAT monitor signal VBATMON is supplied to the ratio switching circuit 25. The VBAT monitor signal VBATMON is set to the High level when the battery voltage VBAT is higher than a predetermined value and is set to the Low level when the battery voltage VBAT is lower than the predetermined value. The ratio switching circuit 25 determines the step-up ratio of the charge pump circuit 21 depending on the VBAT monitor signal. VBATMON. In the case where the ratio switching circuit 25 sets the voltage monitor switching signal PMODELIM to the Low level, the charge pump circuit 21 carries out the double boosting operation. On the other hand, in the case where the ratio switching circuit 25 sets the voltage monitor switching signal PMODELIM to the High level, the charge pump circuit 21 carries out the triple boosting operation.

Next, the operation of the boost circuit 200 shown in FIGS. 2A and 2B will be described below. If the ratio switching circuit 25 detects increase in the battery voltage VBAT based on the VBAT monitor signal VBATMON, the ratio switching circuit 25 sets the voltage monitor switching signal PMODELIM to the Low level and thereby sets the step-up ratio of the charge pump circuit 21 to double. In response to the voltage monitor switching signal PMODELIM being set to the Low level, the switch S119 of the charge pump circuit 21 is set to always OFF, the switch S11C of the adder/comparison circuit 22 is set to ON and the switch S11B thereof is set to OFF, as shown in FIG. 2A. As a result, the adder/comparison circuit 22 sets the output signal VCTL to the High level if the sum-based voltage VADD is lower than the reference value VADD1 and sets the output signal VCTL to the Low level if the sum-based voltage VADD is higher than the reference value VADD1.

FIG. 3A shows respective states of the switches S111 to S119 and S11B to S11E when the boost clock signal DCCLK is at the High level and at the Low level in the case of the double boosting operation. In FIG. 3A, it should be noted that the switches S111 to S118, S11D and S11E of the charge pump circuit 21 are turned ON/OFF in synchronization with the boost clock signal DCCLK in the case of the double boosting operation.

The double boosting operation of the charge pump circuit 21 in the case of the "first operation" where the output signal VCTL from the adder/comparison circuit 22 is at the High level (when the sum-based voltage VADD is lower than the reference value VADD1) is as follows. That is, the switches S112 and S117 charge the boost capacitor C11 with the battery voltage VBAT. The switches S111 and S115 boost the boost output terminal 21a with the battery voltage VBAT and the voltage VC11 of the boost capacitor C11 to charge the smoothing capacitor C13 and generate the output power supply voltage VDD2. The switch S11D takes the voltage VC11 of the boost capacitor C11 (under-charge boost capacitor)

during the boost capacitor C11 is being charged, and outputs the voltage VC11 to the adder/comparison circuit 22. The switches S114 and S118 charge the boost capacitor C12 with the battery voltage VBAT. The switches S113 and S116 boost the boost output terminal 21a with the battery voltage VBAT and the voltage VC12 of the boost capacitor C12 to charge the smoothing capacitor C13 and generate the output power supply voltage VDD2. The switch S11E takes the voltage VC12 of the boost capacitor C12 (under-charge boost capacitor) during the boost capacitor C12 is being charged, and outputs the voltage VC12 to the adder/comparison circuit 22. In this manner, the boost capacitors C11 and C12 are charged and discharged, and the output power supply voltage VDD2 is generated at the boost output terminal 21a.

the other hand, the double boosting operation of the charge pump circuit 21 in the case of the "second operation" where the output signal VCTL from the adder/comparison circuit 22 is at the Low level (when the sum-based voltage VADD is higher than the reference value VADD1) is as follows. The switches S117 and S118 (charge switches) are set to OFF irrespective of the boost clock signal DCCLK, and thus the charging of the boost capacitors C11 and C12 is stopped. Meanwhile, the discharging of the boost capacitors C11 and C12 continues. Therefore, the voltage VC11 of the boost capacitor C11, the voltage VC12 of the boost capacitor C12 and the output power supply voltage VDD2 are decreased with the discharging.

Let us consider a condition of the reference voltage VREF and the resistance values R15 to R17 for setting the output power supply voltage VDD2 to a desired value VDD2* in the case of the double boosting operation. For simplicity, the respective voltages VC11 and VC12 of the boost capacitors C11 and C12 are the same value VC. In this case, the following relational expression can be obtained.

$$VADD=(VC+VDD2+VBAT)/3 \quad (3)$$

$$VCMP=VADD \times R17/(R15+R16+R17) \quad (4)$$

In order to set the output power supply voltage VDD2 to the desired value VDD2*, "VCMP=VREF" needs to be satisfied when "VC+VBAT=VDD2*". Therefore, the following relational expression can be obtained.

$$2 \times VDD2*/3 = VREF \times (R15+R16+R17)/R17 \quad (5)$$

By designing the reference voltage VREF and the resistance values R15 to R17 to satisfy the above relational expression (5), it is possible to set the output power supply voltage VDD2 to the desired value VDD2* in the case of the double boosting operation.

On the other hand, if the ratio switching circuit 25 detects decrease in the battery voltage VBAT based on the VBAT monitor signal VBATMON, the ratio switching circuit 25 sets the voltage monitor switching signal PMODELIM to the High level and thereby sets the step-up ratio of the charge pump circuit 21 to triple. In response to the voltage monitor switching signal PMODELIM being set to the High level, the switches S113 and S115 of the charge pump circuit 21 are set to always OFF, the switch S11C of the adder/comparison circuit 22 is set to OFF and the switch S11B thereof is set to ON, as shown in FIG. 2B. As a result, the adder/comparison circuit 22 sets the output signal VCTL to the High level if the sum-based voltage VADD is lower than the reference value VADD2 and sets the output signal VCTL to the Low level if the sum-based voltage VADD is higher than the reference value VADD2.

FIG. 3B shows respective states of the switches S111 to S119 and S11B to S11E when the boost clock signal DCCLK is at the High level and at the Low level in the case of the triple boosting operation. In FIG. 3B, it should be noted that the switches S111, S112, S114, S116 to S119, S11D and S11E of the charge pump circuit 21 are turned ON/OFF in synchronization with the boost clock signal DCCLK and the switches S113 and S115 are always turned OFF, in the case of the triple boosting operation.

The triple boosting operation of the charge pump circuit 21 in the case of the "first operation" where the output signal VCTL from the adder/comparison circuit 22 is at the High level (when the sum-based voltage VADD is lower than the reference value VADD2) is as follows. That is, the switches S112 and S117 charge the boost capacitor C11 with the battery voltage VBAT. The switch S111 boosts a connection node connecting the boost capacitors C11 and C12 with the battery voltage VBAT and the voltage VC11 of the boost capacitor C11. The switch S11D takes the voltage VC11 of the boost capacitor C11 (under-charge boost capacitor) during the boost capacitor C11 is being charged, and outputs the voltage VC11 to the adder/comparison circuit 22. The switches S114 and S118 charge the boost capacitor C12 with the battery voltage VBAT. The switches S116 and S119 boost the boost output terminal 21a with the battery voltage VBAT, the voltage VC11 of the boost capacitor C11 and the voltage VC12 of the boost capacitor C12 to charge the smoothing capacitor C13 and generate the output power supply voltage VDD2. The switch S11E takes the voltage VC12 of the boost capacitor C12 (under-charge boost capacitor) during the boost capacitor C12 is being charged, and outputs the voltage VC12 to the adder/comparison circuit 22. In this manner, the boost capacitors C11 and C12 are charged and discharged, and the output power supply voltage VDD2 is generated at the boost output terminal 21a.

On the other hand, the triple boosting operation of the charge pump circuit 21 in the case of the "second operation" where the output signal VCTL from the adder/comparison circuit 22 is at the Low level (when the sum-based voltage VADD is higher than the reference value VADD2) is as follows. The switches S117 and S118 (charge switches) are set to OFF irrespective of the boost clock signal DCCLK, and thus the charging of the boost capacitors C11 and C12 is stopped. Meanwhile, the discharging of the boost capacitors C11 and C12 continues. Therefore, the voltage VC11 of the boost capacitor C11, the voltage VC12 of the boost capacitor C12 and the output power supply voltage VDD2 are decreased with the discharging.

Let us consider a condition of the reference voltage VREF and the resistance values R15 to R17 for setting the output power supply voltage VDD2 to a desired value VDD2* in the case of the triple boosting operation. In this case, the following relational expression can be obtained.

$$VADD=(VC11+VC12+VDD2+VBAT)/4 \quad (6)$$

$$VCMP=VADD \times (R16+R17)/(R15+R16+R17) \quad (7)$$

In order to set the output power supply voltage VDD2 to the desired value VDD2*, "VCMP=VREF" needs to be satisfied when "VC11+VC12+VBAT=VDD2*". Therefore, the following relational expression can be obtained.

$$2 \times VDD2*/4 = VREF \times (R15+R16+R17)/(R16+R17) \quad (8)$$

By designing the reference voltage VREF and the resistance values R15 to R17 to satisfy the above relational expression (8), it is possible to set the output power supply voltage VDD2 to the desired value VDD2* in the case of the triple boosting operation.

By designing the reference voltage VREF and the resistance values R15 to R17 to satisfy both of the relational expressions (5) and (8), it is possible to set the output power supply voltage VDD2 to the desired value VDD2* in both cases of the second boosting operation and the triple boosting operation.

The above-described boost circuit 200 shown in FIGS. 2A and 2B is capable of switching the operation between the double boosting operation and the triple boosting operation depending on the battery voltage VBAT, which can support a wide range of the battery voltage VBAT. However, the inventor of the present application has found the following two problems with respect to the boost circuit 200.

Figure 4:
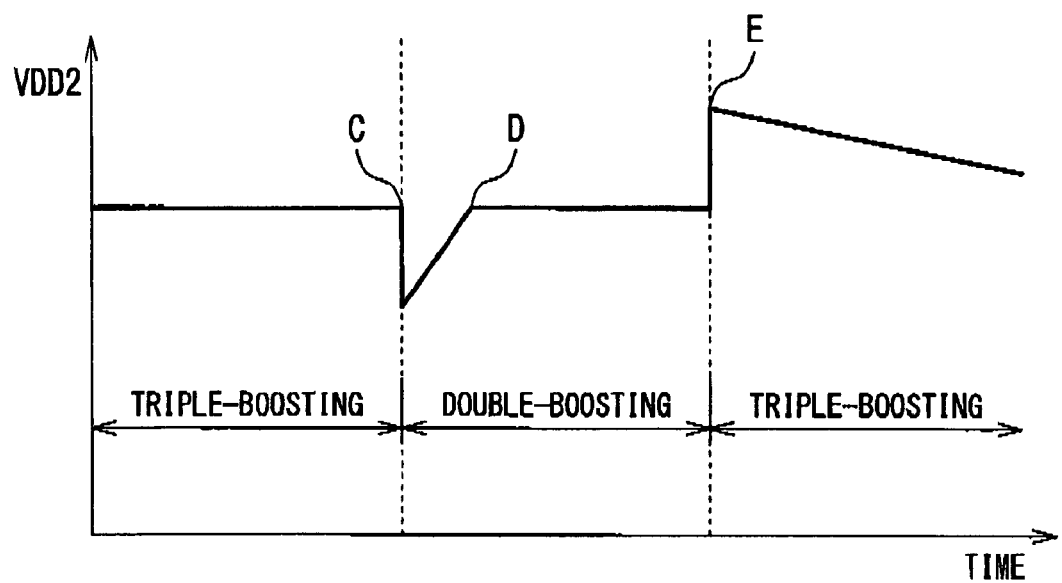
FIG. 4 is a graph showing a waveform of an output power supply voltage when the step-up ratio is switched between double and triple in the boost circuit shown in FIGS. 2A and 2B.

The first problem is that when the operation of the charge pump circuit 21 is switched from the triple boosting operation to the double boosting operation, electric charges are pulled in from the boost output terminal 21a due to shortage of electric charges of the boost capacitors C11 and C12, which decreases the output power supply voltage VDD2. Points C and D shown in FIG. 4 indicate such a variation in the output power supply voltage VDD2 when the operation of the charge pump circuit 21 is switched from the triple boosting operation to the double boosting operation.

The second problem is that when the operation of the charge pump circuit 21 is switched from the double boosting operation to the triple boosting operation, the output power supply voltage VDD2 is increased due to residual electric charges of the boost capacitors C11 and C12. A point E in FIG. 4 indicates such a variation in the output power supply voltage VDD2 when the operation of the charge pump circuit 21 is switched from the double boosting operation to the triple boosting operation.

Figure 5A:
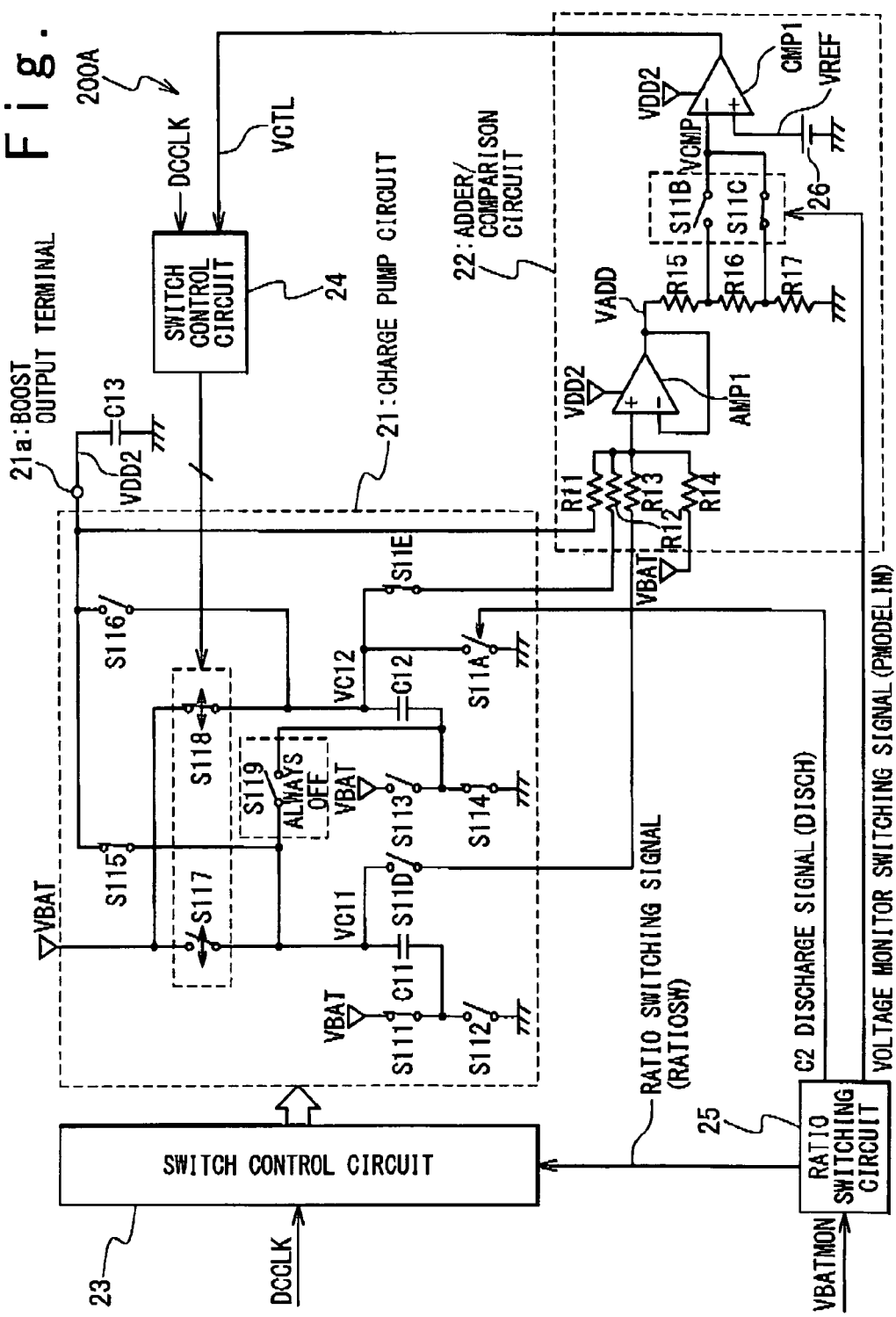
FIGS. 5A and 5B each is a circuit diagram showing a configuration of a boost circuit according to an exemplary embodiment of the present invention.
Figure 5B:
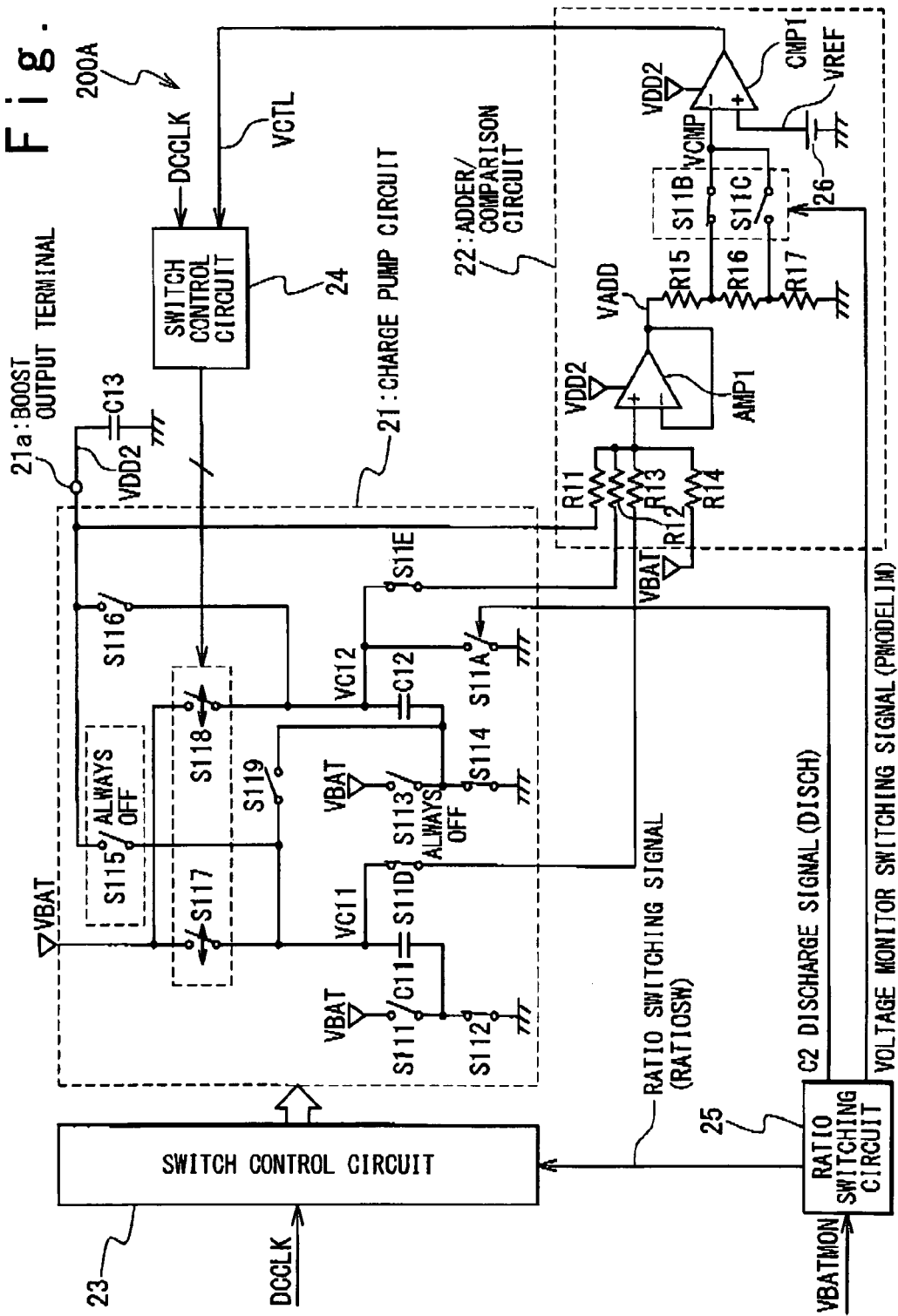

FIGS. 5A and 5B show a configuration of a boost circuit 200A for solving the problems. FIG. 5A is associated with the double boosting operation, and FIG. 5B is associated with the triple boosting operation. The boost circuit 200A shown in FIGS. 5A and 5B is different from the boost circuit 200 shown in FIGS. 2A and 2B in the following points. Firstly, in the case of the boost circuit 200A shown in FIGS. 5A and 5B, a ratio switching signal RATIOSW for switching the setting of the charge pump circuit 21, which is different from the voltage monitor switching signal PMODELIM supplied to the adder/comparison circuit 22, is supplied from the ratio switching circuit 25 to the switch control circuit 23. In response to the ratio switching signal RATIOSW, the switch control circuit 23 sets the operation of the charge pump circuit 21 to the double boosting operation or the triple boosting operation. To provide the ratio switching signal RATIOSW apart from the voltage monitor switching signal PMODELIM makes it possible to carry out the switching of the setting of the adder/comparison circuit 22 prior to the switching of the setting of the charge pump circuit 21. As will be described later, to carry out the switching of the setting of the adder/comparison circuit 22 prior to the switching of the setting of the charge pump circuit 21 is important to prevent increase and decrease in the output power supply voltage VDD2. Secondly, a switch S11A (discharge switch) is added for discharging electric charges of the boost capacitor C12 to the ground. A C2 discharge signal DISCH is supplied to the switch S11A from the ratio switching circuit 25. When the step-up ratio is switched from double to triple, the C2 discharge signal DISCH is asserted to turn ON the switch S11A, and thereby the boost capacitor C12 is discharged through the discharge switch 311A.

An operation of the boost circuit 200A shown in FIGS. 5A and 5B will be described below. Although the basic operation of the boost circuit 200A is the same as that of the boost circuit 200 shown in FIGS. 2A and 2B, the operation at the time of switching the step-up ratio is different. The operation at the time of switching the step-up ratio will be described below in detail.

FIG. 6A is a timing chart showing the operation of the boost circuit 200A when the boosting operation is switched from the triple boosting operation to the double boosting operation. When the battery voltage VBAT is increased and the VBAT monitor signal VBATMON is changed from the High level to the Low level, the ratio switching circuit 25 switches the operation of the boost circuit 200A from the triple boosting operation to the double boosting operation. More specifically, the ratio switching circuit 25 first switches the voltage monitor switching signal PMODELIM from the High level to the Low level at a timing when the boost capacitors C11 and C12 are switched from the discharging state to the charging state. As a result, the above-mentioned reference value of the sum-based voltage VDD with which the output signal VCTL of the adder/comparison circuit 22 transits is switched from the first value VADD2 to the second value VADD1 (>VADD2). Consequently, the reference value of the sum-based voltage VDD with which the output signal VCTL transits is increased, and thus the voltages VC11 and VC12 respectively charged to the boost capacitors C11 and C12 are increased. After that, the ratio switching circuit 25 switches the ratio switching signal RATIOSW so as to switch the operation of the charge pump circuit 21 from the triple boosting operation to the double boosting operation. In this manner, the shortage of electric charges of the boost capacitors C11 and C12 is resolved, and thus decrease in the output power supply voltage VDD2 can be suppressed as indicated by a point B in FIG. 7.

Figure 6B:
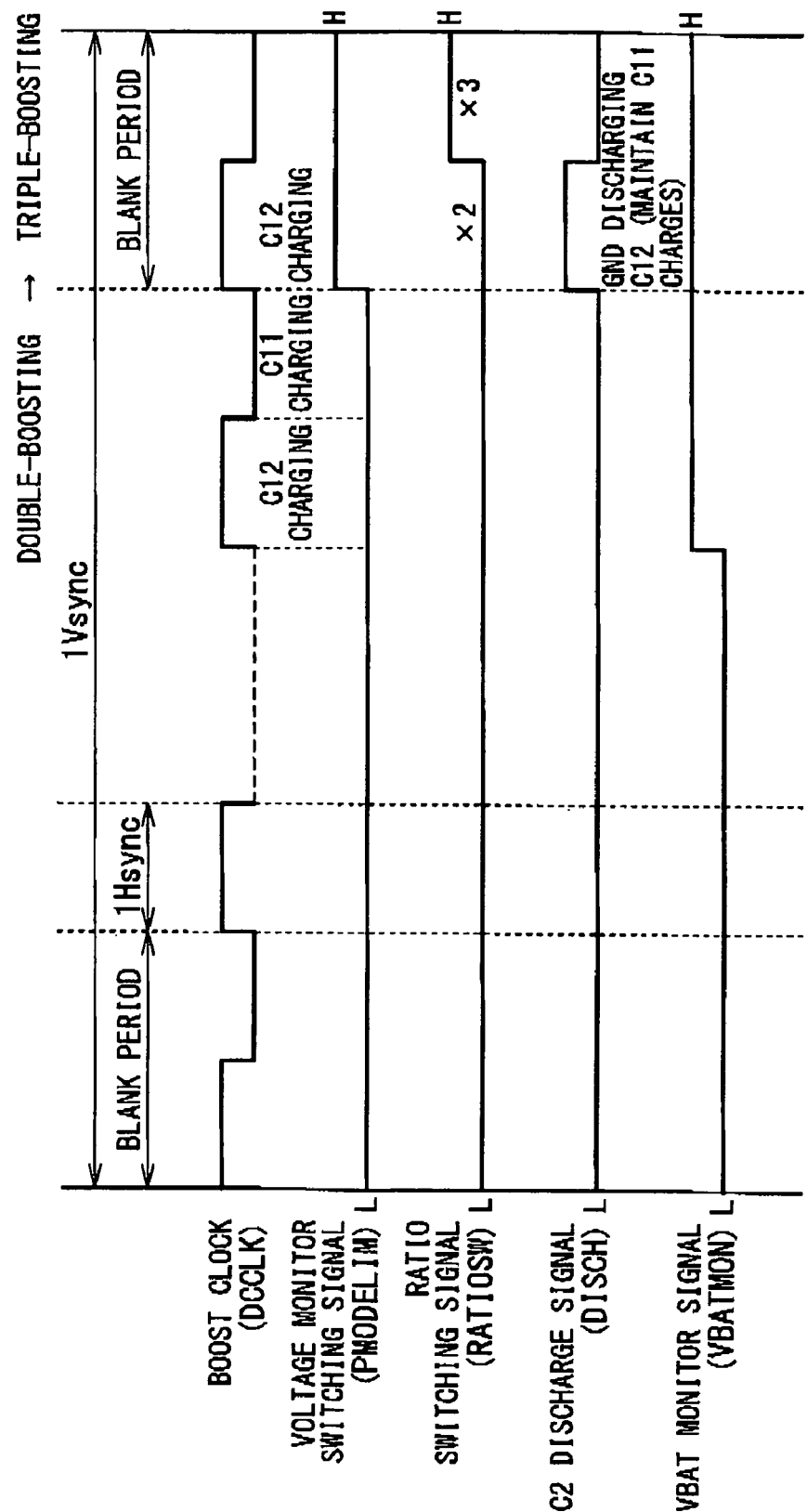
FIG. 6B is a timing chart showing an operation of the boost circuit shown in FIGS. 5A and 5B when the step-up ratio is switched from double to triple.

FIG. 6B is a timing chart showing the operation of the boost circuit 200A when the boosting operation is switched from the double boosting operation to the triple boosting operation. When the battery voltage VBAT is decreased and the VBAT monitor signal VBATMON is changed from the Low level to the High level, the ratio switching circuit 25 switches the operation of the boost circuit 200A from the double boosting operation to the triple boosting operation. More specifically, the ratio switching circuit 25 first switches the voltage monitor switching signal PMODELIM from the Low level to the High level at a timing when charging of the boost capacitor C11 (second boost capacitor) is completed and it is switched to charging of the boost capacitor C12 (first boost capacitor). As a result, the above-mentioned reference value of the sum-based voltage VDD with which the output signal VCTL of the adder/comparison circuit 22 transits is switched from the second value VADD1 to the first value VADD2 (<VADD1). At the same timing, the C2 discharge signal DISCH is asserted and thus residual electric charges of the boost capacitor C12 (first boost capacitor) are discharged to the ground through the discharge switch S11A. In other words, the boost capacitor C12 (first boost capacitor) is discharged to the ground at the moment when the boost capacitor C12 is charged by control of the boost clock signal DCCLK. Note that the boost capacitor C11 (second boost capacitor) is connected to the boost output terminal 21a at this time and thus electric charges of the boost capacitor C11 is not discharged to the ground. After that, the ratio switching circuit 25 switches the ratio switching signal RATIOSW so as to switch the operation of the charge pump circuit 21 from the double boosting operation to the triple boosting operation. In this manner, excessive electric charges in the boost capacitors C11 and C12 are resolved, and thus increase in the output power supply voltage VDD2 can be suppressed as indicated by a point A in FIG. 7.

Figure 7:
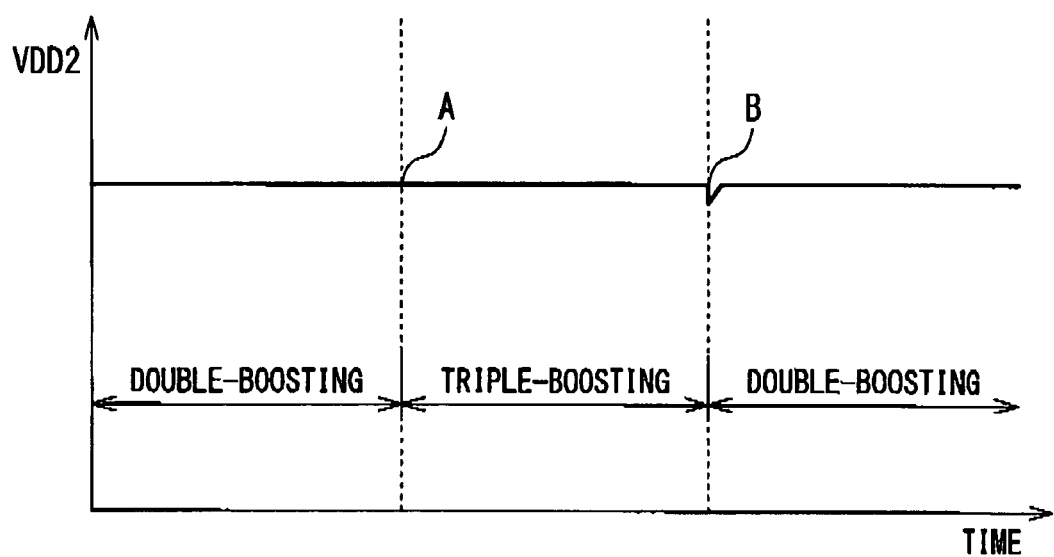
FIG. 7 is a graph showing a waveform of an output power supply voltage when the step-up ratio is switched between double and triple in the boost circuit shown in FIGS. 5A and 5B.

As described above, according to the operations shown in FIGS. 6A and 6B, variation in the output power supply voltage VDD2 at the time of switching the step-up ratio of the boost circuit 200A can be suppressed as shown in FIG. 7.

In the case where the boost circuit is applied to the liquid crystal display device 10 as in the present exemplary embodiment, it is preferable that the switching of the step-up ratio is carried out during a display blank period in the vertical synchronization period, as shown in FIGS. 6A and 6B. As a result, the output power supply voltage VDD2 during a display period is stabilized (i.e., noise of the power supply is reduced) and hence image quality can be improved.

Although the discharge switch S11A is connected between the boost capacitor C12 and the ground in the case of the boost circuit 200A shown in FIGS. 5A and 5B, the discharge switch S11A can be connected between the boost capacitor C11 and the ground. In this case, when the boosting operation is switched from the double boosting operation to the triple boosting operation, the voltage monitor switching signal PMODELIM is switched from the Low level to the High level at a timing when charging of the boost capacitor C12 (second boost capacitor) is completed and it is switched to charging of the boost capacitor C11 (first boost capacitor). As a result, electric charges of the boost capacitor C11 are discharged to the ground at a moment when the boost capacitor C11 is charged by control of the boost clock signal DCCLK, and thus increase in the output power supply voltage VDD2 can be suppressed Although the step-up ratio is switched between double and triple in the case of the boost circuit 200A shown in FIGS. 5A and 5B, a combination of the switchable step-up ratios is not limited to that. It should be noted that the present invention can generally be applied to a case where the charge pump circuit 21 has a plurality of boost capacitors and the step-up ratio is switched by switching the connection relationship between the boost capacitors.

Figure 8B:
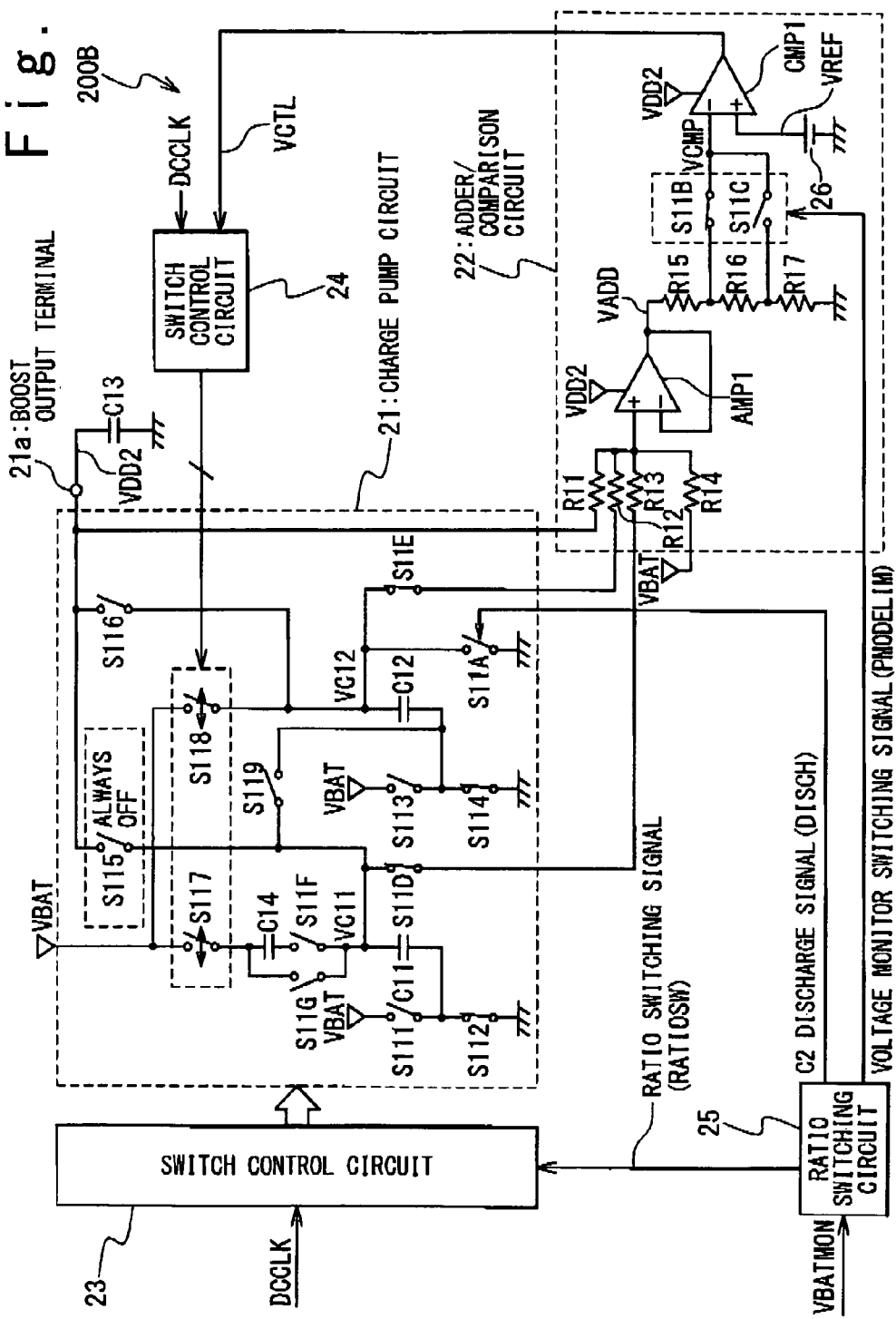

For example, the present invention can be applied also to a case where the step-up ratio is switched between double and 2.5-fold as in a boost circuit 200B shown in FIGS. 8A and 8B. According to the boost circuit 200B shown in FIGS. 8A and 8B, switches S11F and S11G and a boost capacitor C14 are added to the boost circuit 200A shown in FIGS. 5A and 5B. FIGS. 9A and 9B are tables showing operations of the switches in the cases of the double boosting operation and the 2.5-boosting operation, respectively. In this case also, the switching of the step-up ratio is carried out in the same manner as that described above.

More specifically, when the boosting operation is switched from the 2.5-boosting operation to the double boosting operation, the voltage monitor switching signal PMODELIM is switched from the High level to the Low level, and the reference value of the voltage VADD with which the output signal VCTL of the adder/comparison circuit 22 transits is switched from the reference value VADD2 to the reference value VADD1 (>VADD2). It should be noted that the reference value VADD2 is adjusted to a value corresponding to the 2.5-boosting operation by the resistance values of the resistor elements R15 to R17. Next, the ratio switching signal RATIOSW is switched and the operation of the charge pump circuit 21 is switched from the 2.5-boosting operation to the double boosting operation.

When the boosting operation is switched from the double boosting operation to the 2.5-boosting operation, the voltage monitor switching signal PMODELIM is switched from the Low level to the High level, and the reference value of the voltage VADD with which the output signal VCTL of the adder/comparison circuit 22 transits is switched from the reference value VADD1 to reference value VADD2 (<VADD1). Furthermore, the C2 discharge signal DISCH is asserted and the electric charges of the boost capacitor C12 are discharged to the ground. Next, the ratio switching signal RATIOSW is switched and the operation of the charge pump circuit 2.1 is switched from the double boosting operation to the 2.5-boosting operation.

It should be noted that the boost circuit 200B shown in FIGS. 8A and 8B can operate as a boost circuit in which the step-up ratio is switchable between 2.5-fold and triple. FIGS. 10A and 10B are tables showing operations of the switches in the cases where the step-up ratio is 2.5-fold and triple, respectively. In this case also, the step-up ratio can be switched in the same manner as that described above, except that the reference values VAAD1 and VAAD2 are adjusted to values corresponding to the 2.5-boosting operation and the triple boosting operation by the resistance values of the resistor elements R15 to R17, and that the operation of the charge pump circuit 21 is switched between the 2.5-boosting operation and the triple boosting operation.

Figure 11A:
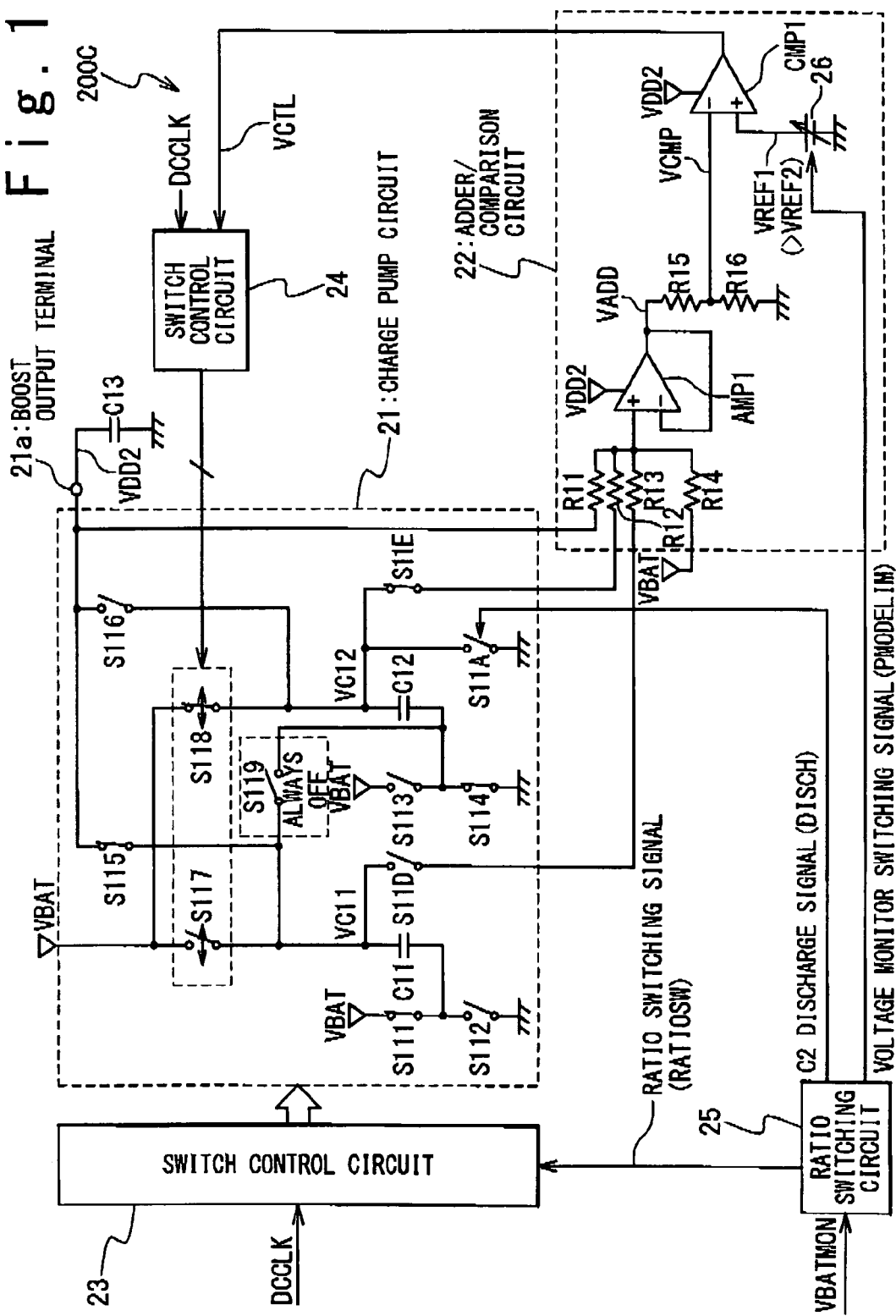

In the above-described exemplary embodiment, the reference value of the voltage VADD with which the output signal VCTL of the adder/comparison circuit 22 transits is switched by switching the ratio between the voltage VADD and the comparison voltage VCMP. A configuration shown in FIGS. 11A and 11B also is possible, where the reference value of the voltage VADD is switched by switching the reference value VREF by using the voltage monitor switching signal PMODELIM. FIG. 11A is associated with an operation of a boost circuit 200C when the double boosting operation is carried out, and FIG. 11B is associated with an operation of the boost circuit 200C when the triple boosting operation is carried out. In this case, the constant-voltage source 26 is configured to output any of reference voltages VREF1 and VREF2 depending on the voltage monitor switching signal PMODELIM. The reference voltage VREF1 is determined corresponding to the lower one of the step-up ratios (double or 2.5-fold in the above-described exemplary embodiment), and the reference voltage VREF2 is determined corresponding to the higher one of the step-up ratios (2.5-fold or triple in the above-described exemplary embodiment). Here, VREF1 is greater than VREF2. It will be obvious for a person skilled in the art that this configuration can also achieve the desired object of the present invention.

It is apparent that the present invention is not limited to the above exemplary embodiments and may be modified and changed without departing from the scope and spirit of the invention.

What is claimed is:

1. A boost circuit comprising:
   a charge pump circuit configured to boost a supply voltage by using a boost clock signal to generate a boost output voltage; and
   a control circuit unit configured to control said charge pump circuit,
   wherein said charge pump circuit comprises;
   a plurality of boost capacitors; and
   a charge switch that supplies said supply voltage to said boost capacitors,
   wherein said charge pump circuit is configured such that a step-up ratio thereof is variable by switching a connection relationship of said plurality of boost capacitors,
   wherein said control circuit unit is configured to control switching of said step-up ratio of said charge pump circuit and to select and perform any of a first operation and a second operation depending on a sum-based voltage, said first operation being to turn ON and OFF said charge switch in synchronization with said boost clock signal, said second operation being to turn OFF said charge switch irrespective of said boost clock signal, and said sum-based voltage being generated corresponding to a sum of said supply voltage and a voltage of a under-charge boost capacitor that is being charged among said plurality of boost capacitors, wherein a value of said sum-based voltage with which an operation of said charge switch is switched between said first operation and said second operation is a reference value, and wherein when switching said step-up ratio of said charge pump circuit from a first ratio to a second ratio lower than said first ratio, said control circuit unit switches said reference value from a first value that is determined corresponding to said first ratio to a second value that is determined corresponding to said second ratio, and then switches said connection relationship of said plurality of boost capacitors of said charge pump circuit.

2. The boost circuit according to claim 1,
wherein said charge pump circuit further comprises a discharge switch that discharges a first boost capacitor of said plurality of boost capacitors to ground, and
wherein when switching said step-up ratio of said charge pump circuit from said second ratio to said first ratio, said control circuit unit switches said reference value of said sum-based voltage from said second value to said first value as well as discharges said first boost capacitor through said discharge switch, and then switches said connection relationship of said plurality of boost capacitors of said charge pump circuit.

3. The boost circuit according to claim 1,
wherein said charge pump circuit is configured such that said plurality of boost capacitors is concurrently charged and discharged when said step-up ratio is said first ratio, and
wherein when switching said step-up ratio of said charge pump circuit from said first ratio to said second ratio, said control circuit unit switches said reference value of said sum-based voltage from said first value to said second value at a timing when said plurality of boost capacitors is switched from discharging to charging.

4. The boost circuit according to claim 2,
wherein said charge pump circuit is configured such that said first boost capacitor and a second boost capacitor of said plurality of boost capacitors are alternately charged and discharged when said step-up ratio is said second ratio, and
wherein when switching said step-up ratio of said charge pump circuit from said second ratio to said first ratio, said control circuit unit discharges said first boost capacitor through said discharge switch at a timing when charging of said second boost capacitor is completed.

5. The boost circuit according to claim 1,
wherein said supply voltage is a battery voltage supplied from a battery, and said control circuit unit switches said step-up ratio of said charge pump circuit depending on said battery voltage.

6. The boost circuit according to claim 1,
wherein said control circuit unit comprises;
an adder circuit unit configured to generate said sum-based voltage corresponding to the sum of said supply voltage and said voltage of said under-charge boost capacitor;
a comparison circuit unit configured to compare a comparison voltage generated by voltage-dividing said sum-based voltage with a predetermined reference voltage; and a switch control circuit configured to select the operation of said charge switch from said first operation and said second operation depending on an output signal of said comparison circuit unit,
wherein said control circuit unit is configured to switch said reference value of said sum-based voltage by switching a ratio of said comparison voltage to said sum-based voltage.

7. The boost circuit according to claim 1,
wherein said sum-based voltage is generated corresponding to a sum of the voltage of said under-charge boost capacitor, said supply voltage and said boost output voltage.

8. A boost circuit comprising;
a charge pump circuit configured to boost a supply voltage by using a boost clock signal to generate a boost output voltage; and
a control circuit unit configured to control said charge pump circuit,
wherein said charge pump circuit comprises:
a plurality of boost capacitors;
a charge switch that supplies said supply voltage to said boost capacitors; and
a discharge switch that discharges one boost capacitor of said plurality of boost capacitors to ground,
wherein said charge pump circuit is configured such that a step-up ratio thereof is variable by switching a connection relationship of said plurality of boost capacitors,
wherein said control circuit unit is configured to control switching of said step-up ratio of said charge pump circuit and to select and perform any of a first operation and a second operation depending on a sum-based voltage, said first operation being to turn ON and OFF said charge switch in synchronization with said boost clock signal, said second operation being to turn OFF said charge switch irrespective of said boost clock signal, and said sum-based voltage being generated corresponding to a sum of said supply voltage and a voltage of a under-charge boost capacitor that is being charged among said plurality of, boost capacitors,
wherein a value of said sum-based voltage with which an operation of said charge switch is switched between said first operation and said second operation is a reference value, and
wherein when switching said step-up ratio of said charge pump circuit from a second ratio to a first ratio higher than said second ratio, said control circuit unit switches said reference value of said sum-based voltage from a second value that is determined corresponding to said second ratio to a first value that is determined corresponding to said first ratio as well as discharges said one boost capacitor through said discharge switch, and then switches said connection relationship of said plurality of boost capacitors of said charge pump circuit.

9. A liquid crystal display device comprising:
the boost circuit according to claim 1;
a liquid crystal display panel; and
a driver circuit unit configured to receive said boost output voltage from said boost circuit and to drive said liquid crystal display panel,
wherein the switching of said step-up ratio of said charge pump circuit is carried out during a display blank period in a vertical synchronization period.

* * * * *